though an observation of a displayed signal was performed by a visual inspection or through a photographic procedure if quantitative measurements were required, the displayed signal had to be measured with, for instance, a micro-photometer, which made the measurement precedure very complex.

3,511,988
SIGNAL DISPLAYING DEVICE FOR USE WITH AN X-RAY MICROANALYZER
Teruichi Tomura, Kokubunji-shi, Japan, assignor to Hitachi, Ltd., Tokyo-to, Japan
Filed Sept. 7, 1966, Ser. No. 577,759
Int. Cl. H01j 29/70, 37/00
U.S. Cl. 250—49.5    2 Claims

ABSTRACT OF THE DISCLOSURE

A signal displaying device including means for converting an input signal representing information to be displayed into a control pulse having a duration time which is exponentially proportional to the intensity of instantaneous values of the input signal.

---

This invention relates to a signal displaying device and more particularly to a quantative signal displaying device used in, for example, an X-ray micro-analyzer in which a characteristic X-ray is obtained from scanning of an electron beam over a surface of a specimen.

The principle, objects, merits, and differences from conventional signal displaying devices will be explained in detail with referring to the accompanying drawings, in which.

Figure 3:
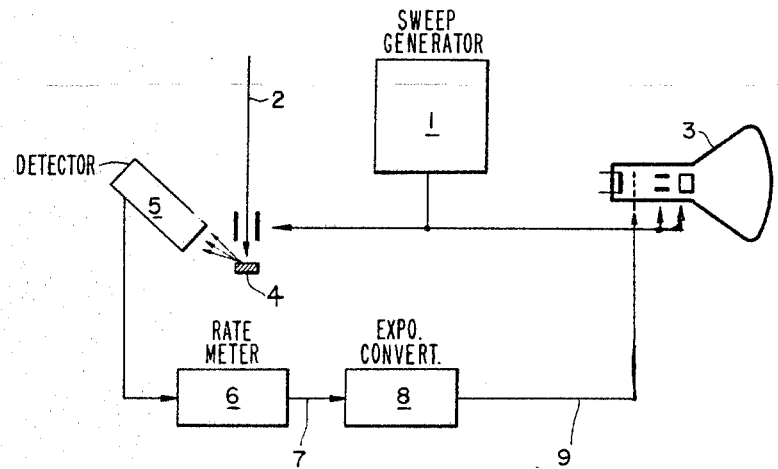
FIG. 3 illustrates a circuit diagram of one embodiment of the present invention which is applied to an X-ray micro-analyzer as an X-ray image recording device therefor.
Figure 4:
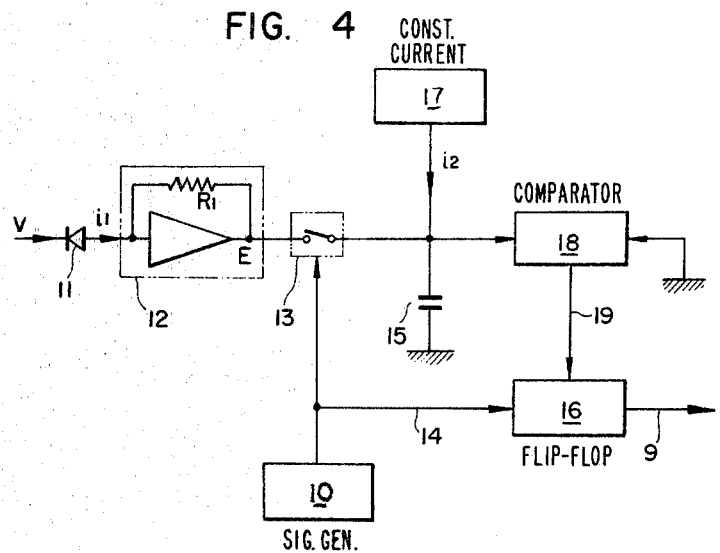
Figure 5:
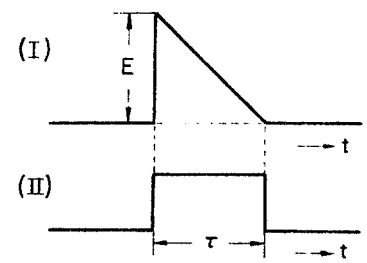

FIG. 4 indicates a circuit which may form one part of the embodiment shown in FIG. 3; and FIG. 5 indicates operating wave forms in the embodiment shown in FIG. 3.

In a conventional X-ray micro-analyzer or the like, a characteristic X-ray obtained from a specific portion of a specimen has been visibly displayed on a two-dimensional signal displaying device. A Braun tube has been widely used as such a signal displaying device, and has operatingly displayed a light spot with a brightness that was varied by the bias voltage of the Braun tube in accordance with the intensity of the obtained characteristic X-ray.

However, in the conventional arrangements, there have been many drawbacks. First, though an observation of a displayed signal was performed by a visual inspection or through a photographic procedure if quantitative measurements were required, the displayed signal had to be measured with, for instance, a micro-photometer, which made the measurement precedure very complex.

Figure 1:
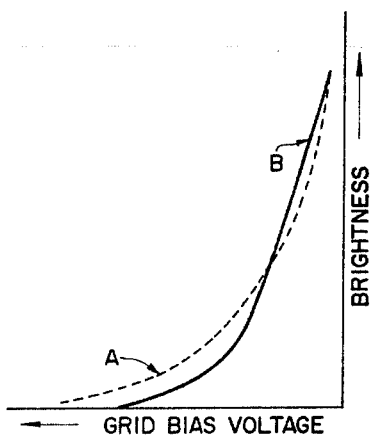
FIG. 1 illustrates graphically a relationship between a grid bias voltage of a Braun tube which is one of conventional signal displaying devices and the brightness of a displayed signal.

Second, since the visual sensitivity of human eyes has a logarithmic characteristic, if the relationship between grid bias voltage of the Braun tube and a brightness of a displayed signal is represented by exponential curve A shown as a dotted line in FIG. 1, the visual sensitivity of human eyes with respect to a displayed signal on a Braun tube will be proportional to the variation of the grid bias voltage, that is, the variation of the input signal to be displayed. However, the practical grid bias voltage to brightness characteristics of most Braun tubes are considerably deviated from the exponential curve A, as shown by full line curve B in FIG. 1. By this reason, an error will be interposed between the visual sensitivity and the brightness intensity of the displayed signal when the displayed signal on a Braun tube is visually inspected. This renders it difficult to measure the brightness of the displayed signal quantitatively through use of human eyes alone.

Third, in the case of use of an X-ray micro-analyzer, wherein a specimen is scanned with an electron beam from one point to another intermittently at intervals of a certain period of time over the surface thereof to obtain a characteristic X-ray from the respective points impacted by the electron beam, the characteristic X-ray provided was to be converted into a pulse train with a pulse density which corresponds to the intensity of the characteristic X-ray through such a device as a counting plate meter.

The discontinuous information signal, i.e., a pulse train, was used for modulating the brightness of the displayed signal on a Braun tube through control over the grid bias voltage of the Braun tube. Since the brightness thereof is proportional to the density of the pulse train, the relationship between a visual sensitivity of the displayed signal and the pulse density of the pulse train is shown in FIG. 2, due to the logarithmic characteristic of the visual sensitivity of human eyes.

Figure 2:
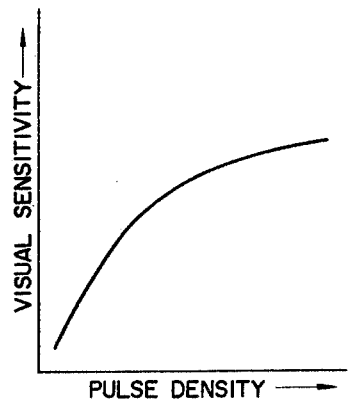
FIG. 2 illustrates graphically a relationship between a visual sensitivity for a brightness of the displayed signal through human eyes and the pulse density of a characteristic X-ray.

From FIG. 2, it is apparent that the visual sensitivity is diminished in the high range of the pulse density.

The primary object of the present invention is to provide an improved and novel signal displaying device in which the above mentioned drawbacks are completely overcome.

Another object is to provide a new quantative signal displaying device in which the visual sensitivity is proportional to the intensity of the displayed signal.

In FIG. 3, a scanning electron beam 2 of the X-ray micro-analyzer is intermittently moved from one point to another on a surface of a specimen 4 and thereby is scanned over the surface by a sweep signal generator 1 which also synchronously moves an electron beam from one point to another to move a spot on a two-dimensional visual face of Braun tube 3. In this analyzer, a point on a specimen 4 where the electron beam 2 is impinging corresponds to a spot on a two-dimensional visual face of the Braun tube 3.

According to this embodiment, the component photons of the characteristic X-ray are converted in detector 5 into a plurality of different pulse train units each composed of from one to ten pulses dependent upon the quantity of photons or the intensity of the characteristic X-ray. In other words, a pulse density of the pulse train corresponds to the characteristic X-ray obtained from one selected point on a specimen. Such a pulse train is thereafter converted into a signal proportional to the pulse density of this pulse train by means of a counting rate meter 6.

A compensating circuit 8 is provided in this embodiment for converting the output signal of the counting rate meter 6 into a control pulse with a width exponentially proportional to the output signal of the counting rate meter 6.

FIG. 4 illustrates an example of the compensating circuit constituting the main part of the embodiment described above, and the composition and operation thereof will be hereinafter explained.

The output voltage V of the output signal 7 from the counting rate meter 6 is converted into a current $$i_1 = K_1 e^{aV}$$

wherein $K_1 = e^b$, by means of for example, a log diode 11 which has such a voltage-current characteristic as defined in the following formula:

$$\ln i = aV + b$$

wherein $i$ is the current flowing through the log diode, $V$ is the voltage appearing across the log diode, and $a$ and $b$ are constants.

The current $i_1$ is in turn amplified by an amplifier 12 having a feed-back resistor R1, and an output voltage $$E = R_1 K_1 e^{aV}$$

is obtained. On the other hand, a constant interval trigger signal generator 10 operatingly renders an electric switch 13 conductive, and simultaneously supplies a set signal 14 to a flip-flop 16.

When the electric switch 13 is rendered conductive, a capacitor 15, one terminal of which is grounded, is charged by the above described voltage E. Then a current 12 is applied to the capacitor 15 from a constant current source 17 with such a polarity that the capacitor 15 hither to charged is thereby discharged.

The capacitor 15 discharged becomes equal to a reference voltage which is zero volt in this case of FIG. 4 by the action of the comparator 18, hence the voltage of the capacitor 15 has a wave form as shown in FIG. 5(I).

At the instant when a charged voltage across the capacitor 15 reaches the reference voltage, the flip-flop 16 is reset by the reset signal 19 which is issued from the comparator 18, and a control pulse 9 shown in FIG. 5(II) is obtained.

The pulse width $\tau$ of the respective pulse 9 varies in accordance with an exponential function of the output voltage obtained from the counting rate meter 6 and is expressed as:

$$\tau = CE/i2 = CR1K1e^{aV}/i2 = Ke^{aV}$$

wherein C is capacitance of the capacitor 15, and K is shown as:

$$K = CR1K1/i2$$

In the signal displaying device according to the present invention that is provided with thus composed compensating circuit 8, an output pulse 9 of the compensating circuit is designed to control a bias voltage of the control grid of the Braun tube 3. The grid bias voltage of the Braun tube is set to be a voltage near to the cut off voltage of the Braun tube while the output pulse 9 is not generated from the compensating circuit 8, and it is jumped to a predetermined voltage which renders the Braun tube operative when the output pulse 9 is generated from the compensating circuit 8.

The constant interval trigger signal generator 10 produces a trigger signal at intervals of a certain period of time which is synchronized with both the electron beam impinging on the surface of the specimen and the spot on the display face of the Braun tube.

The maximum duration time or the width of the control pulse 9 which is set to be exponentially proportional to the maximum quantity of photons of or the intensity of the characteristic X-ray, is designed to terminate within the interval of time of the constant interval trigger signal generator 10. The brightness of the displayed spot on the displaying face of the Braun tube is provided to be exponentially proportional to the density of the pulse train and thus the visual sensitivity becomes proportional to an intensity of the characteristic X-ray, i.e., quantity of photons or intensity thereof, obtained from a respective point on the specimen 4.

According to the present invention, respective spots displayed in turn on the displaying face of the Braun tube provide quantities of lights each proportional to the intensity of the characteristic X-ray obtained from the corresponding point on the specimen. This results in enabling quantitative measurement of the characteristic X-ray.

If a continuous input is obtained, it is preferable to convert the input into said control pulse by using the above circuit in order to obtain a quantitatively measurable displayed signal.

In the present invention any Braun tubes may be used even if they have non-exponential characteristics in relationship between brightnesses displayed and the grid bias voltages thereof, since the brightness of light of the displayed signal is rendered in exponential proportion to the input signal.

It is clear from the disclosure described above that the range of the brightness of the displayed signal may be varied by setting the maximum duration time of the control pulse to a desired period of time.

Although the foregoing explanation has been carried out for the cases where the Braun tube was utilized as signal displaying means, the present invention is not limited to such Braun tube but is applicable to any displaying means other than Braun tubes, which have non-exponential characteristics in a brightness to input signal relationship.

I claim:
1. A signal displaying device comprising:
means for converting an input signal including an information to be displayed into a control pulse having a duration time which is exponentially proportional to the intensity of said input signal,
a cathode-ray tube having a grid electrode for controlling the intensity of a scanning electron beam, and
means for supplying the control pulse to the grid electrode to allow a spot to be displayed for the period of the duration of time of said control pulse,
wherein said converting means includes a log diode, an amplifier having an input connected to said log diode and an output, switch means for connecting the output of said amplifier to a capacitor for charging said capacitor from the output of said amplifier, a constant current source connected to said capacitor providing a current for discharging said capacitor, a comparator connected to said capacitor providing an output pulse when said capacitor reaches a prescribed voltage level, a periodic signal generator periodically operating said switch means, and a flip-flop selectively actuated by said periodic signal generator and said output pulse to provide said control pulse of variable duration.

2. In combination with an X-ray microanalyzer having a system for intermittently scanning at intervals of a certain period of time over the surface of a specimen from one point to another with an electron beam and detector means to obtain a pulse train whose density is proportional to the intensity of a characteristic X-ray received from each point of said specimen whereon said electron beam is impacting, a signal displaying device for quantitatively displaying said characteristic X-ray comprising
first converting means connected to said detector means for converting said pulse train into a continuous signal whose intensity is proportional to the density of the pulse train,
second converting means connected to said first converting means for converting the continuous signal into a control pulse having a duration time which is exponentially proportional to the intensity of said continuous signal,
a cathode-ray tube having a grid electrode for controlling the intensity of a scanning electron beam which is intermittently scanned synchronously with the scanning of the electron beam over the surface of the specimen in said X-ray microanalyzer, and
means for supplying the control pulse to the grid electrode,
wherein said second converting means includes a log diode, an amplifier having an input connected to said log diode and an output, switch means for connecting the output of said amplifier to a capacitor for charging said capacitor from the output of said amplifier, a constant current source connected to said capacitor providing a current for discharging said capacitor, a comparator connected to said capacitor providing an output pulse when said capacitor reaches a prescribed voltage level, a periodic signal generator periodically operating said switch means, and a flip-flop selectively actuated by said periodic signal generator and said output pulse to provide said control pulse of variable duration.

References Cited

UNITED STATES PATENTS

| | | | |
|---|---|---|---|
| 3,103,584 | 9/1963 | Shapiro et al. | 250—49.5 |
| 3,274,385 | 9/1966 | Tomita | 250—49.5 |

WILLIAM F. LINDQUIST, Primary Examiner

U.S. Cl. X.R.

315—22

UNITED STATES PATENT OFFICE
CERTIFICATE OF CORRECTION

Patent No. 3,511,988          Dated May 12, 1970

Inventor(s) Teruichi TOMURA

It is certified that error appears in the above-identified patent and that said Letters Patent are hereby corrected as shown below:

Title page insert the following:

Claims Priority, application Japan, September 13, 1965, 55645/1965

Signed and Sealed this

Seventeenth Day of August 1976

[SEAL]

Attest:

RUTH C. MASON
*Attesting Officer*

C. MARSHALL DANN
*Commissioner of Patents and Trademarks*